United States Patent
Xiong et al.

(10) Patent No.: US 9,867,041 B2
(45) Date of Patent: Jan. 9, 2018

(54) METHODS AND SYSTEMS FOR DETERMINING PROTECTED LOCATION INFORMATION BASED ON TEMPORAL CORRELATIONS

(71) Applicant: Emory University, Atlanta, GA (US)

(72) Inventors: Li Xiong, Atlanta, GA (US); Yonghui Xiao, Atlanta, GA (US)

(73) Assignee: Emory University, Atlanta, GA (US)

( * ) Notice: Subject to any disclaimer, the term of this patent is extended or adjusted under 35 U.S.C. 154(b) by 0 days.

(21) Appl. No.: 15/299,582

(22) Filed: Oct. 21, 2016

(65) Prior Publication Data
US 2017/0118634 A1 Apr. 27, 2017

Related U.S. Application Data

(60) Provisional application No. 62/244,725, filed on Oct. 21, 2015.

(51) Int. Cl.
*H04M 1/66* (2006.01)
*H04W 12/02* (2009.01)
*H04W 8/16* (2009.01)

(52) U.S. Cl.
CPC ............. *H04W 12/02* (2013.01); *H04W 8/16* (2013.01)

(58) Field of Classification Search
CPC ................................. H04W 12/02; H04W 8/16
USPC ....................... 455/414.1, 414.2, 404.2, 457, 455/456.1–456.6
See application file for complete search history.

(56) References Cited

U.S. PATENT DOCUMENTS 7,853,545 B2 12/2010 Chang et al.
8,266,712 B2 9/2012 Chow et al.
8,856,939 B2 10/2014 Cai et al.
(Continued)

FOREIGN PATENT DOCUMENTS

WO 2014204487 A1 12/2014

OTHER PUBLICATIONS

Bamba, B et al. "PRIVACYGRID: Supporting Anonymous Location Queries in Mobile Environments." Technical Report, Georgia Institute of Technology, 2007 [retrieved from the Internet <URL: https://smartech.gatech.edu/handle/1853/20111> on May 15, 2017].
(Continued)

*Primary Examiner* — Wayne Cai
(74) *Attorney, Agent, or Firm* — Emory Patent Group

(57) ABSTRACT

The systems and methods can provide location privacy protection by incorporating temporal correlations of a user's locations. The method may include obtaining a first location of a user of a mobile user device. The method may further include determining one or more probable locations of the user for a time period from historical location information. The method may further include determining a reference location based on the first location and/or the one or more probable locations. The method may include determining a set of location(s) defining a bounded region based on the one or more probable locations and/or the reference location and privacy parameter(s) associated with the user. The method may include determining a second location from the bounded region and determining protected location information based on the reference location and the second location. The method may include communicating the protected location information.

20 Claims, 5 Drawing Sheets

(56) References Cited

U.S. PATENT DOCUMENTS

| | | | |
|---|---|---|---|
| 8,935,268 B2 | 1/2015 | Uramoto et al. | |
| 9,347,784 B2* | 5/2016 | Inoue | B60L 11/1838 |
| 2013/0298248 A1* | 11/2013 | Boldrev | G06F 21/6245 726/26 |
| 2014/0059695 A1 | 2/2014 | Parecki et al. | |

OTHER PUBLICATIONS

Gedik, B et al. "A Customizable k-Anonymity Model for Protecting Location Privacy." Technical Report, Georgia Institute of Technology, 2004 [retrieved from the Internet <URL: http://cercs.gatech.edu/tech-reports/tr2004/git-cercs-04-15.pdf> on May 15, 2017].

Kapadia, A et al. "AnonySense: Opportunistic and Privacy-Preserving Context Collection." Proceedings of the International Conference on Persuasive Computing, Lecture Notes in Computer Science, 2008, 5013:280-297.

Li, P et al. "A Cloaking Algorithm based on Spatial Networks for Location Privacy." IEEE International Conference on Sensor Networks, Ubiquitous, and Trustworthy Computing, 2008, pp. 90-97.

Lingappa, G. "Anonymity-preserving location data publishing." Graduate Theses and Dissertations, Paper 10083, Iowa State University, 2009 [retrieved from the Internet <URL: http://lib.dr.iastate.edu/cgi/viewcontent.cgi?article=1046&context=etd> on May 23, 2017].

Liu, L. "From Data Privacy to Location Privacy: Models and Algorithms." Proceedings of the 33rd International Conference on Very Large Data Bases, 2007, pp. 1429-1430.

Liu, Y et al. "An efficient method for privacy preserving location queries." Frontiers of Computer Science, 2012; 6(4): 409-420.

Pingley, A. "CAP: A Context-Aware Privacy Protection System for Location-Based Services." Master's Thesis, University of Texas at Arlington, 2008 [retrieved from the Internet <URL: https://uta-ir.tdl.org/uta-ir/bitstream/handle/10106/1045/umi-uta-2150.pdf?sequence=1&isAllowed=y> on May 23, 2017].

Vicente, C et al. "Location-Related Privacy in Geo-Special Networks." IEEE Internet Computing, 2011, 15(3):20-27.

Xiao, Y et al. "Protecting Locations with Differential Privacy under Temporal Correlations." Proceedings of the 22nd ACM SIGSAC Conference on Computer and Communications Security, 2015, pp. 1298-1309.

Xu, T et al. "Location Depersonalization for Location Privacy Protection in Location-Based Services." IEEE Transactions on Mobile Computing, 2008, pp. 1-13.

* cited by examiner

METHODS AND SYSTEMS FOR DETERMINING PROTECTED LOCATION INFORMATION BASED ON TEMPORAL CORRELATIONS

CROSS-REFERENCE TO RELATED APPLICATION

This application claims the benefit of U.S. Provisional Application No. 62/244,725 filed Oct. 21, 2015. The entirety of this application is hereby incorporated by reference for all purposes.

BACKGROUND

There has been a rapid development of GPS-enabled devices and location-based applications, such as searching points of interest, location-based games, location-based commerce and location-based social networks. To use these applications, users have to provide their locations to the respective service providers or other third parties. Providing location of a user can raise important privacy concerns because it can expose a user to attacks ranging from unwanted location-based spams/scams to blackmail or even physical danger.

Currently, most location privacy techniques do not provide a rigorous privacy guarantee. Many techniques only consider static scenarios or perturb the location at single timestamps and therefore can vulnerable to various inference attacks.

SUMMARY

Thus, there is need for systems and methods that provide a more rigorous privacy guarantee.

The disclosure relates to systems and methods that provide location privacy protection by incorporating temporal correlations of a moving user's locations. Therefore, the systems and methods can protect the location of a user beyond a single time point. The systems and methods can be provide privacy protection of a user, for example, in any location-based applications (e.g., that provide location-based services).

In some embodiments, the method may include a method for determining protected location information of a user. In some embodiments, the method may include obtaining a first location of at least one user of a mobile user device. The method may further include determining one or more probable locations of the at least one user for a time period from historical location information associated with the at least one user collected by the mobile user device and/or one or more applications stored on the mobile user device. The method may then include determining a reference location based on the first location and/or the one or more probable locations associated with the at least one user. The method may further include determining a set of one or more locations based on the one or more probable locations and/or the reference location and one or more privacy parameters associated with the at least one user. The set of one or more location points may define a bounded region. The method may include determining a second location from the bounded region. The method may include determining protected location information based on the reference location and the second location. The method may include communicating the protected location information to a service provider and/or another device communicating with the at least one user device, for example, that provide location-based services.

In some embodiments, the systems may include a system for determining protected location information of a user. The system may include at least one processor; and a memory. In some embodiments, the processor may be configured to cause obtaining a first location of at least one user of a mobile user device. The processor may be configured to cause determining one or more probable locations of the at least one user for a time period from historical location information associated with the at least one user collected by the mobile user device and/or one or more applications stored on the mobile user device. The processor may be configured to cause determining a reference location based on the first location and/or the one or more probable locations associated with the at least one user. The processor may be configured to further cause determining a set of one or more locations based on the one or more probable locations and/or the reference location and one or more privacy parameters associated with the at least one user. The set of one or more location points may define a bounded region. The processor may be configured to cause determining a second location from the bounded region. The processor may be configured to cause determining protected location information based on the reference location and the second location. The processor may be configured to cause communicating the protected location information to a service provider and/or another device communicating with the at least one user device.

Additional advantages of the disclosure will be set forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, emphasis being placed upon illustrating the principles of the disclosure.

DESCRIPTION OF THE EMBODIMENTS

Figure 1:
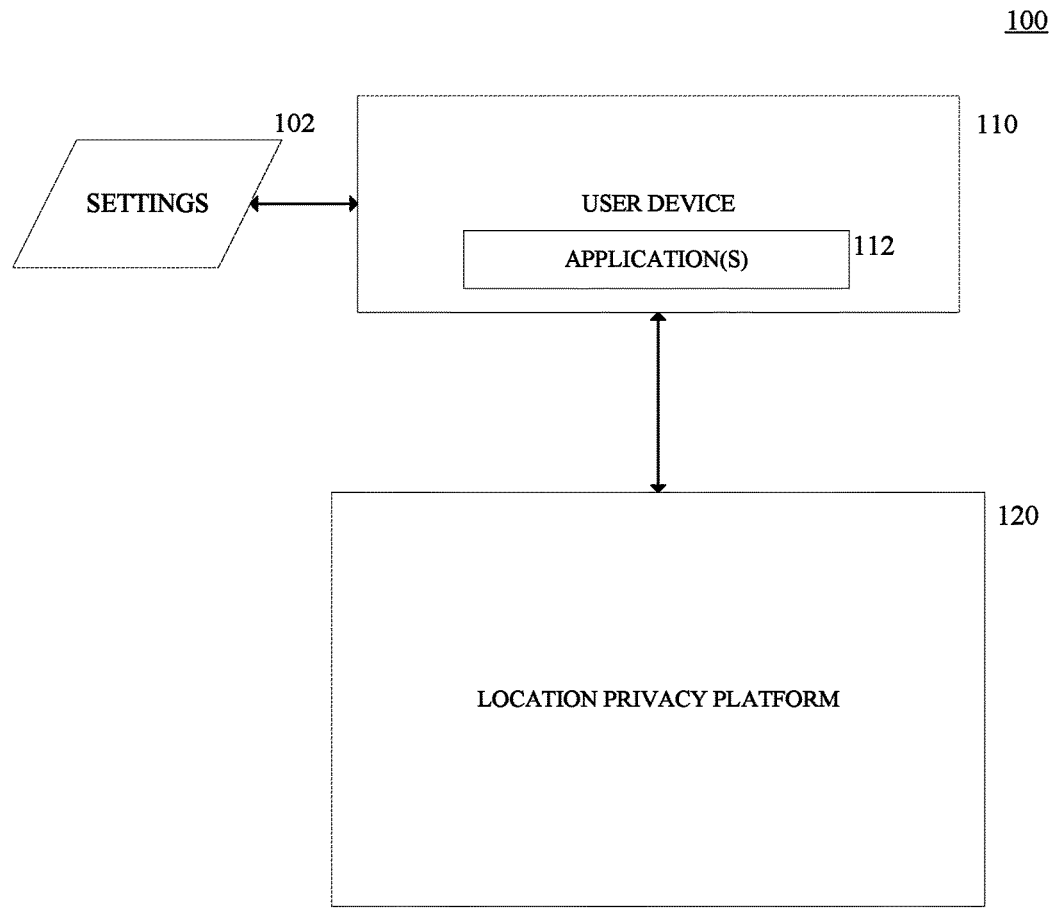
FIG. 1 shows an example of a system for determining protected location information according to some embodiments.

In the following description, numerous specific details are set forth such as examples of specific components, devices, methods, etc., in order to provide a thorough understanding of embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

The systems and methods of the disclosure can protect the true location of a user at every time period or point (e.g., timestamp) using a probable location set based differential privacy. The systems and methods can therefore address the challenges in applying differential privacy in the new setting of continual location sharing by using temporal correlations. First, the systems and methods can provide privacy protection on the fly. Second, the systems and methods can provide a privacy guarantee that account for temporal correlations based on road networks and/or the user's moving patterns. In this way, the systems and methods can protect location of a user with consideration of historical time. The systems and methods can therefore provide "sanitized" locations of a moving user who wants to share her locations to an untrusted location-based application host or other parties with a sensitive location stream.

FIG. 1 shows a system 100 that can provide temporal-based location privacy according to embodiments. In some embodiments, the system 100 may include at least one user device 110 and a location privacy platform 120 (e.g., hosted at and/or coupled to a user device 110). In some embodiments, the user device 110 may have connectivity to the location privacy platform 120 via a communication network. By way of example, the communication network of system 100 can include one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, NFC/RFID, RF memory tags, touch-distance radios, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Although the systems/devices of the system 100 are shown as being directly connected, the systems/devices may be indirectly connected to one or more of the other systems/devices of the system 100. In some embodiments, a system/device may be only directly connected to one or more of the other systems/devices of the system 100.

It is also to be understood that the system 100 may omit any of the systems and/or devices illustrated and/or may include additional systems and/or devices not shown. It is also to be understood that more than one device and/or system may be part of the system 100 although one of each device and/or system is illustrated in the system 100. It is further to be understood that each of the plurality of devices and/or systems may be different or may be the same.

The user device 110 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. The user device 110 can also support any type of interface to the user (such as "wearable" circuitry, etc.). By way of example, the user device 110 and the location privacy platform 120 can communicate with each other and other components of the communication network using well known, new or still developing protocols. In some embodiments, the platform 120 may include a non-transitory computer-readable medium storing program instructions thereon that is operable on the user device 110.

In some embodiments, the location privacy platform 120 may directly and/or indirectly determine and/or collect the location of a user from the user device 110 using a localization technology. By way of example, the location privacy platform 120 can collect location information, such as a location measurement, data source type (e.g., methods used for determining data, GPS based methods, non-GPS based methods, etc.), accuracy (e.g., level of accuracy of the collected location data), source of location information (e.g., applications accessing the data), etc. The location measurement may include time (e.g., timestamp (i.e., the date and time when the data was collected)) and/or an estimate of the position of the location of the user device 110 being measured (e.g., by geodetic positioning, such as latitude and longitude). In some embodiments, the localization technology may include but is not limited to a Global Positioning System (GPS), a Wi-Fi Positioning System (WPS), and a Cellular-ID look-up (CID), among others, or a combination thereof. As described herein, a location measurement or a series of location measurements can be received and/or processed (e.g., perturbed) by the location privacy platform 120 to determine protected location information. The protected location may be an obfuscated location or a perturbed location.

In some embodiments, the location privacy platform 120 can use different sources, for location information collection and determination. By way of example, the user device 110 may determine the location information, for example, via application(s) 112 that access the location data, collect the information and transmit the location information to the location privacy platform 120. In some embodiments, the location privacy platform 110 may automatically determine the location in real-time and refresh the location information as the users carrying the user device 110 are on the move. In some embodiments, the location privacy platform 120 may monitor the location of the user device 110 in real-time, periodically, based on a pre-determined schedule, demands from the user device 110, demands from the application(s) 112, demands from a service provider, among others, or a combination thereof.

In some embodiments, one or more applications 112 may perform all or a portion of the functions of the location privacy platform 120. In some embodiments, the one or more applications 112 may include any type of application that can be executed on the user device 110. The one or more applications 112 can include a location privacy application and can also include client programs (e.g., calendar applications, communication applications, Internet browsing applications, social networking applications, content applications, etc.), services, or the like that utilize or interact with the location privacy platform 120 or other services, applications, content, etc. available over the communication network(s). In some embodiments, a location privacy application performing all or a portion of the functions of the location privacy platform 120 may be downloadable. In one embodiment, the dynamic location privacy platform 120 may interface with one or more of the applications 112 on the user device 120 to perform one or more functions described herein.

In some embodiments, a service provider can be a location-based application/provider that can provide various services to the user through the user device 110 that depend on or are improved by a determination of a location (e.g., geodetic position) of the user. For example, a service provider may provide cellular services (e.g., cellular telephone service, short message service, among others), contextual services (e.g., mapping services, restaurant recommendations, etc.), among others, or a combination thereof, based on the location of the user device 110. In some embodiments, the platform 120 may output the protected location to the service provider, for example, if the service provider may be considered not worthy of being "entrusted" with the location information at the time of each location measurement 104 to keep such information private.

In some embodiments, the location privacy platform 120 may determine the protected location information based on "true" location of a user ("true" location information). The "true" or first location information may correspond to the location information determined by a localization technology, e.g., GPS provided on the user device 110. In some embodiments, the location privacy platform 120 may determine a protected location information based on the true location information and probable location information for a time period (e.g., a timestamp t).

In some embodiments, the location privacy platform 120 may process the true location information based on one or more privacy settings stored in the privacy settings 102 for one or more applications 112 and/or for the user device 110. In some embodiments, the privacy settings may be stored and managed locally, for example, on the user device 110, and/or at a network level. The privacy settings may include one or more privacy parameters/settings that relate to a level of location privacy (e.g., level of anonymity). For example, the higher level of location privacy, the protected location will be determined using a larger region (e.g., more location points) thereby resulting in a higher level of anonymity and a more "protected" location of the user.

In some embodiments, one or more of the privacy settings may be set by the user, network and/or service provider, among others, or a combination thereof. For example, in some embodiments, the user may set the privacy settings so that they may be location and/or time specific. For example, users may want a higher level of location privacy for certain locations, such as their home, office, children's school, etc., and/or certain time periods, such as during lunch hour.

In some embodiments, the privacy settings may set an overall desired level of location privacy for a group of the application(s) 112, an individual or specific level of location privacy for each application 112, or a combination thereof. For example, the privacy settings for a group(s) of applications 120 may be based on the type of data the application access, the type of service the application provide, the type of technology the application on which it is based, among others, or a combination thereof.

FIGS. 2-5 show methods of determining protected location information from temporal correlations of probable locations according to embodiments. Unless stated otherwise as apparent from the following discussion, it will be appreciated that terms such as "comparing," "modifying," "generating," "determining," "calibrating," "displaying," "obtaining," "processing," "computing," "selecting," "receiving," "detecting," "estimating," "calculating," "quantifying," "outputting," "acquiring," "analyzing," "retrieving," "inputting," "moving," "assessing," "performing," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. The system for carrying out the embodiments of the methods disclosed herein is not limited to the systems shown in FIGS. 1 and 6. Other systems may also be used.

The methods of the disclosure are not limited to the steps described herein. The steps may be individually modified or omitted, as well as additional steps may be added. It will be also understood that at least some of the steps may be performed in parallel.

Figure 2:
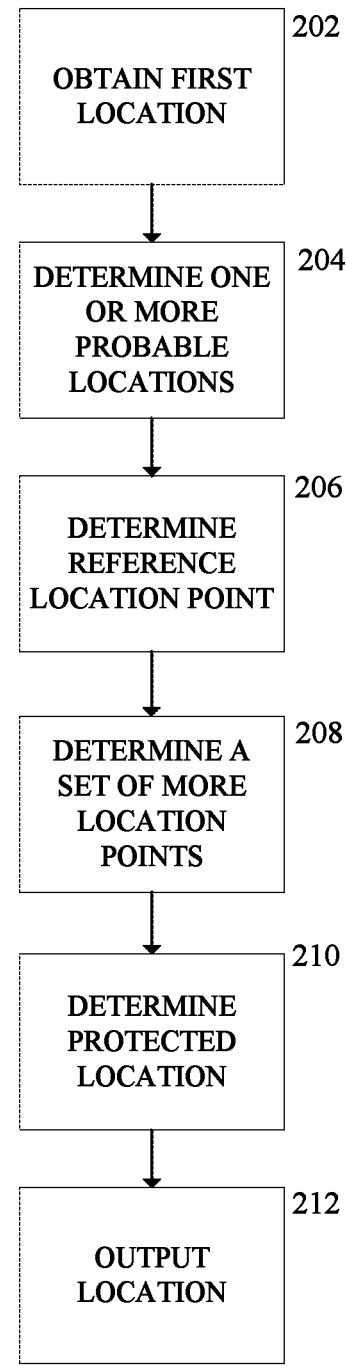
FIG. 2 shows a method of determining protected location information based on a true location according to some embodiments.

FIG. 2 illustrates a method 200 for determining protected location information according to one or more embodiments. The protected temporal location can correspond to a perturbed or obfuscated location based on temporal correlations of probable locations.

In some embodiments, the method 200 may include a step 202 of obtaining first location information, for example, by one of the localization techniques. In this way, the first location information may be considered the "true" location of the user.

Next, in some embodiments, the method 200 may include a step 204 of determining a set of one or more probable locations. The set of one or more probable locations may correspond to all probable locations where a user might appear.

Figure 3:
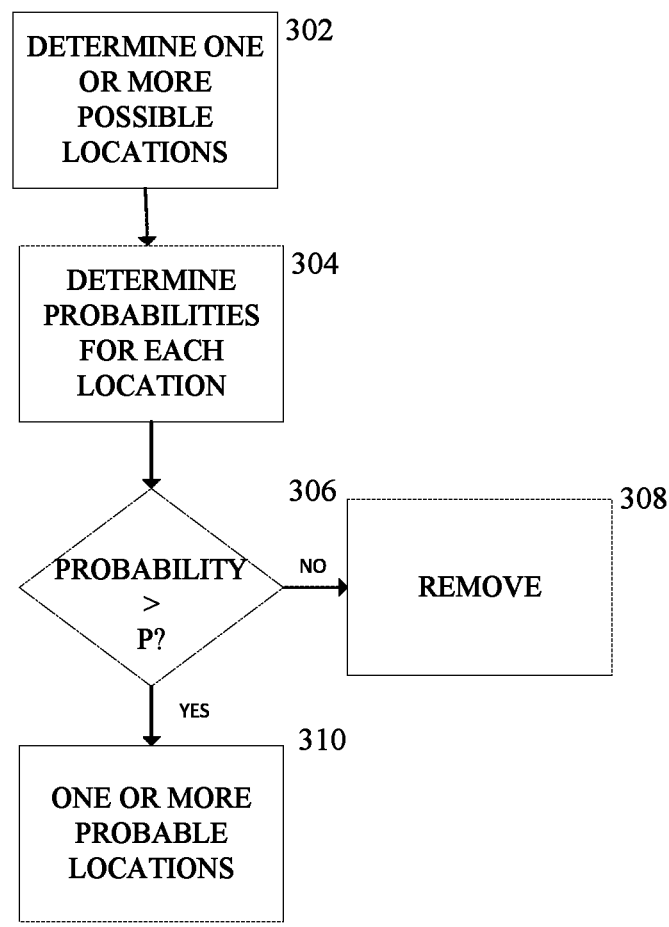
FIG. 3 shows a method of determining a set of probable locations according to some embodiments.

FIG. 3 shows a method 300 of determining a set of one or more probable locations according to some embodiments. As shown in FIG. 3, the method 300 of a step 302 of determining one or more possible locations where a user may move to and from the true location. The one or more possible locations may be determined and/or inferred (e.g., using prediction models (e.g., Markov model) from historical information associated with the user collected by the user device and/or one or more applications. The historical information may include historical locations (e.g., historically released locations, historical locations stored in calendar and/or other applications, among others), other contextual information (e.g., road network, moving patterns of users among others), among others, or a combination thereof.

Next, the method 300 may include a step 304 of determining probabilities of each possible location. For example, the probabilities of each possible location can be determined by prior knowledge (e.g., common knowledge, auxiliary knowledge, among others, or any combination thereof). In some embodiments, the method 300 may optionally include a step 306 of comparing the probabilities to a threshold (P) to remove any unlikely location. The threshold (P) may be stored in the user and/or service provider user settings. If the probability for a location is less than the threshold (NO at step 306), then that location may not be included in the set of probable locations (step 308). If the probability for a location is greater than a threshold (YES at step 306), then that location may be included in the set of probable locations (step 310).

After a set of probable locations are determined, then the method 200 may optionally include a step 206 of determining a reference location. In some embodiments, the reference location may act as surrogate location in the determination of the protected location.

Figure 4:
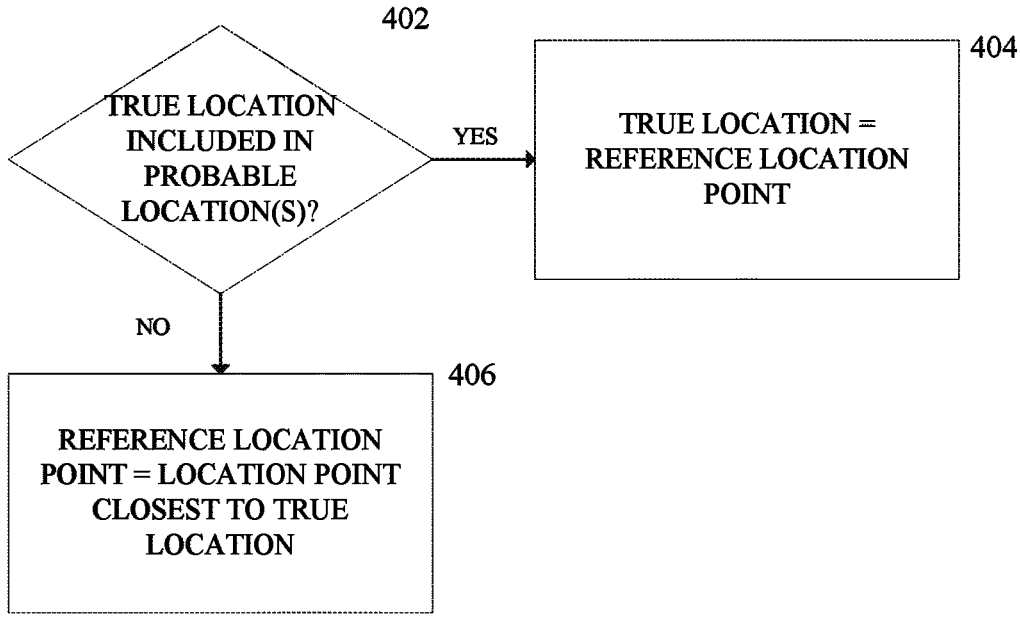
FIG. 4 shows a method of determining a reference location according to embodiments.

FIG. 4 shows a method 400 of determining a surrogate location according to some embodiments. In some embodiments, the method 400 may include a step 402 of determining whether the true or first location is included in set of probable locations. In some embodiments, if the true location is included in the set of probable locations (YES at step 402), then the true location may be considered the reference location (step 404). If the true location is not included in the set of probable locations (NO at step 402), then a location included in the set of probable locations may be selected as the reference location (step 406).

After the reference location is determined, the method 200 may include a step 208 of determining a set of one or more locations based on the one or more probable locations and/or the reference location and a privacy parameter/setting associated with the user, user device, among others, or a combination thereof. The set of one or more location (points) may define a defined/bounded region represented by a geometric shape. The defined/bounded region (e.g., convex polygon) may be an area occupied by the set of points. The set of one or more locations may correspond to a sensitivity hull.

In some embodiments, the step 208 may include determining a plurality of vectors for each probable location. Each location may include a vector that extends between that location to the remaining probable locations. The step 208 may include generating a defined/bounded region using the vectors. For example, a defined/bounded region may be generated so that all of the vectors are inside. The defined/bounded region may be visualized as a shape. The define/bounded region may have any shape, such as a symmetric geometric shape. The shape may include but is not limited to a polygon, ellipse, square, rectangle, parallelogram, among others. In this way, the define/bounded region may correspond to a convex hull (also referred to as a sensitivity hull). In some embodiments, the defined/bounded region may include locations points so that is the smallest convex set that contains the vectors. In some embodiments, the convex hull may further be refined by adding additional points to the boundary of the defined/bounded region and therefore changing or increasing the shape. In some embodiments, the reference location may be the center of the bounded/defined region.

In some embodiments, the step 208 may include transforming and/or changing the defined/bounded region to a different shape, size, and/or space. By way of example, the step 208 may include transforming the determined defined/bounded region to isotropic space. By way of another example, the step 208 may include transforming the shape of the defined/bounded region to another shape, for example, to smooth the determined defined/bounded region. For example, the step 208 may include changing a polygon that defines the defined/bounded region to another geometric shape that includes that polygon. By way of another example, the step 208 may include enlarging the defined/bounded region so as to expand the region. The transformation and/or changing of the defined/bounded region may be based on the privacy settings. For example, the privacy settings may include one or more privacy settings/parameters that indicates that the level of location privacy may be increased and the defined region may be enlarged by a factor defined by that privacy setting/parameter (e.g., an amplifying coefficient). By transforming and/or changing the defined/bounded region, the location of the user may be perturbed.

Next, the method 200 may include a step 210 of determining protected location information based on the set of one or more locations that define a bounded region and the reference location.

Figure 5:
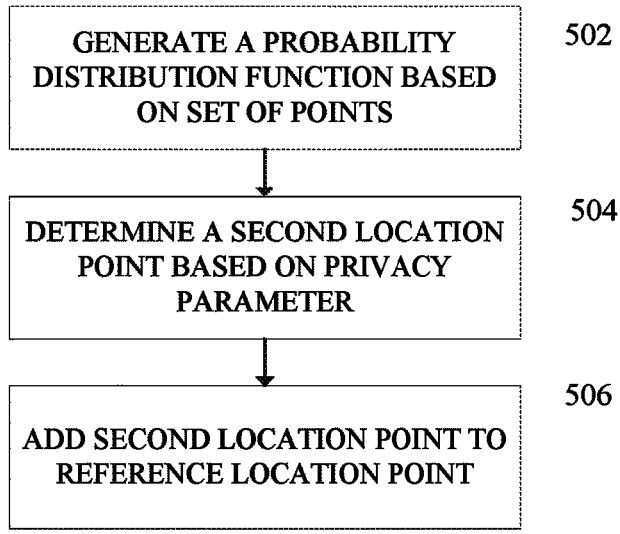
FIG. 5 shows a method of determining a protected location according to embodiments.

FIG. 5 shows a method 500 of determining protected location information according to some embodiments. In some embodiments, the method 500 may include a step 502 of determining a probability distribution based on the location points included in the defined/bounded region (e.g., sensitivity hull) to determine and an amplifying coefficient. In some embodiments, the amplifying coefficient may be determined from the user's privacy settings. By way of example, the amplifying coefficient may be a number determined using the user's privacy settings.

In some embodiments, the step 502 may include determining the probability based on the defined/bounded region for any location point included in the defined region, excluded in the defined/bounded region, among others, or any combination thereof. In some embodiments, the probability of a location point may be based on the distance of that location point to a center point of the defined/bounded region. In this example, the further a location point is from the center point, the lower the probability for that location point.

In some embodiments, the method 500 may include a step 504 of determining a second location (e.g., a sample location) from the defined/bounded region, for example, by using the probability distribution. In some embodiments, a location point on the border of the defined/bounded region (e.g., surface of the sensitivity hull) may be selected randomly. In some embodiments, the location point may be randomly selected based on the stored privacy settings. In some embodiments, the location point may be amplified by the amplifying coefficient. In some embodiments, if the bordered region is transformed to isotropic space, the second location may be transformed to original space.

Next, the method 500 may include a step 506 of determining the protected location based on the first location and the second location. For example, the protected location may be determined by adding the coordinates of second location to the coordinates of the first location (i.e., true location) to determine a protected location.

After the protected location is determined, the method 200 may include a step 212 of outputting the protected location. For example, the outputting may include but is not limited to displaying, storing, transmitting, communicating, among others, or a combination thereof. By way of example, the step 212 may include communicating the protected location to another device/application/service that is communicating with the user via the user device. For example, the step 212 may include communicating the protected location to a service provider (e.g., location-based service provider), another user (e.g., a second user device), among others, or a combination thereof. In some embodiments, the system may cause services to be provided/delivered to the user device based on the protected location information.

Figure 6:
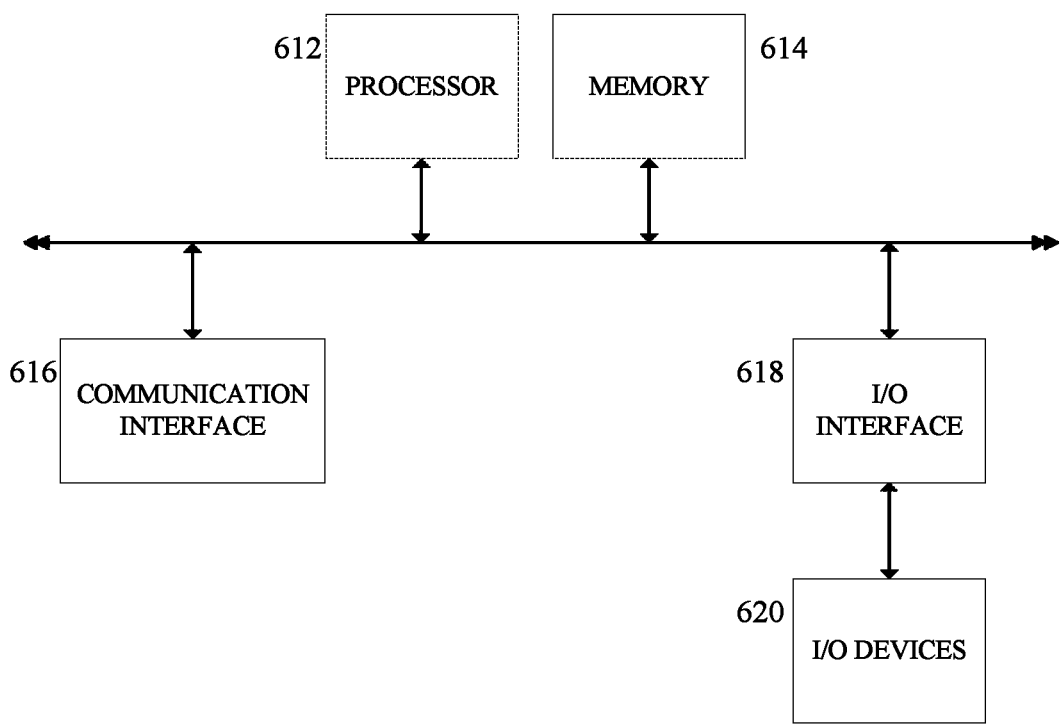
FIG. 6 shows a block diagram illustrating an example of a computing system.

One or more of the devices and/or systems of the location privacy system 100 may be and/or include a computer system and/or device. FIG. 6 is a block diagram showing an example of a computer system 600. The modules of the computer system 600 may be included in at least some of the systems and/or modules, as well as other devices and/or systems of the system 100.

The system for carrying out the embodiments of the methods disclosed herein is not limited to the systems shown in FIGS. 1 and 6. Other systems may also be used. It is also to be understood that the system 600 may omit any of the modules illustrated and/or may include additional modules not shown.

The system 600 shown in FIG. 6 may include any number of modules that communicate with each other through electrical or data connections (not shown). In some embodiments, the modules may be connected via any network (e.g., wired network, wireless network, or a combination thereof).

The system 600 may be a computing system, such as a workstation, computer, or the like. The system 600 may include one or more processors 612. The processor(s) 612 (also referred to as central processing units, or CPUs) may be any known central processing unit, a processor, or a microprocessor. The CPU 612 may be coupled directly or indirectly to one or more computer-readable storage media (e.g., memory) 614. The memory 614 may include random access memory (RAM), read only memory (ROM), disk drive, tape drive, etc., or a combinations thereof. The memory 614 may be configured to store programs and data, including data structures. In some embodiments, the memory 614 may also include a frame buffer for storing data arrays.

In some embodiments, another computer system may assume the data analysis or other functions of the CPU 612. In response to commands received from an input device, the programs or data stored in the memory 614 may be archived in long term storage or may be further processed by the processor and presented on a display.

In some embodiments, the system 600 may include a communication interface 616 configured to conduct receiving and transmitting of data between other modules on the system and/or network. The communication interface 616 may be a wired and/or wireless interface, a switched circuit wireless interface, a network of data processing devices, such as LAN, WAN, the internet, or combination thereof. The communication interface may be configured to execute various communication protocols, such as Bluetooth, wireless, and Ethernet, in order to establish and maintain communication with at least another module on the network.

In some embodiments, the system 610 may include an input/output interface 618 configured for receiving information from one or more input devices 620 (e.g., a keyboard, a mouse, and the like) and/or conveying information to one or more output devices 620 (e.g., a printer, a CD writer, a DVD writer, portable flash memory, etc.). In some embodiments, the one or more input devices 620 may be configured to control, for example, the generation of the management plan and/or prompt, the display of the management plan and/or prompt on a display, the printing of the management plan and/or prompt by a printer interface, the transmission of a management plan and/or prompt, among other things.

In some embodiments, the disclosed methods (e.g., FIGS. 2-5) may be implemented using software applications that are stored in a memory and executed by a processor (e.g., CPU) provided on the system 100. In some embodiments, the disclosed methods may be implemented using software applications that are stored in memories and executed by CPUs distributed across the system.

As such, any of the systems and/or modules of the system 100 may be a general purpose computer system, such as system 600, that becomes a specific purpose computer system when executing the routines and methods of the disclosure. The systems and/or modules of the system 100 may also include an operating system and micro instruction code. The various processes and functions described herein may either be part of the micro instruction code or part of the application program or routine (or combination thereof) that is executed via the operating system.

If written in a programming language conforming to a recognized standard, sequences of instructions designed to implement the methods may be compiled for execution on a variety of hardware systems and for interface to a variety of operating systems. In addition, embodiments are not described with reference to any particular programming language. It will be appreciated that a variety of programming languages may be used to implement embodiments of the disclosure. An example of hardware for performing the described functions is shown in FIGS. 1 and 6. It is to be further understood that, because some of the constituent system components and method steps depicted in the accompanying figures can be implemented in software, the actual connections between the systems components (or the process steps) may differ depending upon the manner in which the disclosure is programmed. Given the teachings of the disclosure provided herein, one of ordinary skill in the related art will be able to contemplate these and similar implementations or configurations of the disclosure.

While the disclosure has been described in detail with reference to exemplary embodiments, those skilled in the art will appreciate that various modifications and substitutions may be made thereto without departing from the spirit and scope of the disclosure as set forth in the appended claims. For example, elements and/or features of different exemplary embodiments may be combined with each other and/or substituted for each other within the scope of this disclosure and appended claims.

What is claimed:

1. A computer-implemented method for determining protected location information of a user, comprising:
    obtaining a first location of at least one user of a mobile user device;
    determining one or more probable locations of the at least one user for a time period from historical location information associated with the at least one user collected by the mobile user device and/or one or more applications stored on the mobile user device;
    determining a reference location based on the first location and/or the one or more probable locations associated with the at least one user;
    determining a set of one or more locations based on the one or more probable locations and/or the reference location and one or more privacy parameters associated with the at least one user, the set of one or more location points defining a bounded region, wherein the determining the set of one or more locations includes:

determining a plurality of vectors from the one or more probable locations, wherein the plurality of vectors includes a vector from each probable location extending to remaining probable locations; and generating a bounded region that includes the plurality of vectors, the bounded region corresponding to a convex polygon;

determining a second location from the bounded region;

determining protected location information based on the reference location and the second location; and communicating the protected location information to a service provider and/or another device communicating with the at least one user device.

2. The method according to claim 1, further comprising:

obtaining the first location information associated with the at least one user, the first location information being for a time period before the time period of the one or more probable locations.

3. The method according to claim 1, wherein the reference location corresponds to the first location and/or one of the probable locations close to the reference location.

4. The method according to claim 1, wherein:

the set of one or more locations corresponds to a sensitivity hull having a geometric shape; and the geometric shape includes an ellipse, circle, rectangle, square, parallelogram, among others.

5. The method according to claim 1, wherein the determining the set of one or more locations further includes transforming the bounded region to another size, another shape and/or isotropic space, wherein the transformation is based on the one or more privacy parameters.

6. The method according to claim 5, wherein the bounded region is increased by a factor determined using a privacy parameter associated with level of privacy.

7. The method according to claim 1, further comprising:

generating a probability distribution function for the bounded region, wherein the second location is randomly selected from a boundary of the bounded region based on the generated probability distribution.

8. The method according to claim 1, wherein the determining the protected location information includes adding coordinates corresponding to the reference location to coordinates corresponding to the second location.

9. The method according to claim 1, further comprising:

delivering one or more services to the at least one user device based on the protected location information.

10. A system for determining protected location information of a user, comprising:

at least one processor; and a memory, wherein the processor is configured to cause:

obtaining a first location of at least one user of a mobile user device;

determining one or more probable locations of the at least one user for a time period from historical location information associated with the at least one user collected by the mobile user device and/or one or more applications stored on the mobile user device;

determining a reference location based on the first location and/or the one or more probable locations associated with the at least one user;

determining a set of one or more locations based on the one or more probable locations and/or the reference location and a privacy parameter associated with the at least one user, the set of one or more location points defining a bounded region, wherein the determining the set of one or more locations includes:

determining a plurality of vectors from the one or more probable locations, wherein the plurality of vectors includes a vector from each probable location extending to remaining probable locations; and generating a bounded region that includes the plurality of vectors, the bounded region corresponding to a convex polygon;

determining a second location from the bounded region;

determining protected location information based on the reference location and the second location; and communicating the protected location information to a service provider and/or another device communicating with the at least one user device.

11. The system according to claim 10, wherein the processor is configured to further cause:

obtaining the first location information associated with the at least one user, the first location information being for a time period before the time period of the one or more probable locations.

12. The system according to claim 11, wherein the reference location corresponds to the first location and/or one of the probable locations close to the reference location.

13. The system according to claim 10, wherein:

the set of one or more locations corresponds to a sensitivity hull having a geometric shape; and the geometric shape includes an ellipse, circle, rectangle, square, parallelogram, among others.

14. The system according to claim 10, wherein the determining the set of one or more locations further includes transforming the bounded region to another size, another shape and/or isotropic space, wherein the transformation is based on the privacy parameter.

15. The system according to claim 14, wherein the bounded region is increased by a factor determined using a privacy parameter associated with level of privacy.

16. The system according to claim 10, wherein the processor is configured to further cause:

generating a probability distribution function for the bounded region, wherein the second location is randomly selected from a boundary of the bounded region based on the generated probability distribution.

17. The system according to claim 10, wherein the determining the protected location information includes adding coordinates corresponding to the reference location to coordinates corresponding to the second location.

18. The system according to claim 10, wherein the processor is configured to further cause:

delivering one or more services to the at least one user device based on the protected location information.

19. A non-transitory computer-readable medium storing instructions, that when executed by a system comprising a processor, cause the processor to perform operations comprising:

obtaining a first location of at least one user of a mobile user device;

determining one or more probable locations of the at least one user for a time period from historical location information associated with the at least one user collected by the mobile user device and/or one or more applications stored on the mobile user device;

determining a reference location based on the first location and/or the one or more probable locations associated with the at least one user;
   determining a set of one or more locations based on the one or more probable locations and/or the reference location and one or more privacy parameters associated with the at least one user, the set of one or more location points defining a bounded region, wherein the determining the set of one or more locations includes:
   determining a plurality of vectors from the one or more probable locations, wherein the plurality of vectors includes a vector from each probable location extending to remaining probable locations; and
   generating a bounded region that includes the plurality of vectors, the bounded region corresponding to a convex polygon;
determining a second location from the bounded region;
determining protected location information based on the reference location and the second location; and
communicating the protected location information to a service provider and/or another device communicating with the at least one user device.

20. The non-transitory computer-readable medium according to claim 19, wherein the operations further comprise:
   obtaining the first location information associated with the at least one user, the first location information being for a time period before the time period of the one or more probable locations.

* * * * *